United States Patent
Nishio et al.

(10) Patent No.: US 6,894,143 B2
(45) Date of Patent: May 17, 2005

(54) POLYETHER POLYMER, PROCESS FOR PRODUCING THE SAME, COMPOSITION FOR SOLID POLYMER ELECTROLYTE, AND USE THEREOF

(75) Inventors: Hideyuki Nishio, Kawasaki (JP); Hidenori Onishi, Kawasaki (JP); Yoshinori Fujii, Kawasaki (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 10/482,052

(22) PCT Filed: Jun. 28, 2002

(86) PCT No.: PCT/JP02/06604
§ 371 (c)(1),
(2), (4) Date: Feb. 13, 2004

(87) PCT Pub. No.: WO03/002669
PCT Pub. Date: Jan. 9, 2003

(65) Prior Publication Data
US 2004/0166417 A1 Aug. 26, 2004

(30) Foreign Application Priority Data
Jun. 29, 2001 (JP) ........................................ 2001-197790
Jul. 23, 2001 (JP) ........................................ 2001-221029

(51) Int. Cl.⁷ ............................................. C08G 65/02
(52) U.S. Cl. ..................... 528/393; 264/176.1; 528/502
(58) Field of Search ....................... 264/176.1; 528/393, 528/502

(56) References Cited

FOREIGN PATENT DOCUMENTS

| EP | 994143 A | | 4/2000 |
|----|----------|---|--------|
| JP | 02-024975 A | | 1/1990 |
| JP | 04-033952 A | | 2/1992 |
| JP | 2000-109675 A | | 4/2000 |
| JP | 2001-217009 A | | 8/2001 |
| JP | 2001-319691 A | | 11/2001 |
| JP | 02003321541 A | * | 11/2003 |

* cited by examiner

Primary Examiner—Terressa Boykin
(74) Attorney, Agent, or Firm—Birch, Stewart, Kolasch & Birch, LLP

(57) ABSTRACT

A composition for solid polymer electrolyte which comprises a polyether polymer and an electrolyte salt compound soluble in the polyether polymer; wherein said polyether polymer is either (1) a polyether polymer having a toluene insoluble content of not larger than 5 weight %, or (2) a polyether polymer having a Mooney viscosity of 3 to 190, which has been prepared by applying a shearing force under heated conditions using an extruder to a polyether polymer having a Mooney viscosity of 10 to 200 so that the Mooney viscosity is reduced by 5 or more. This composition exhibits good film-forming property, and gives a solid polymer electrolyte exhibiting good and uniform ionic conductivity, and having high mechanical strength and surface smoothness. The solid polymer electrolyte is suitable for batteries and capacitors, especially for a lithium ion secondary battery.

9 Claims, No Drawings

POLYETHER POLYMER, PROCESS FOR PRODUCING THE SAME, COMPOSITION FOR SOLID POLYMER ELECTROLYTE, AND USE THEREOF

This application is the national phase under 35 U.S.C. § 371 of PCT International Application No. PCT/JP02/06604 which has an International filing date of Jun. 28, 2002, which designated the United States of America.

FIELD OF THE INVENTION

This invention relates to a solid polymer electrolyte suitable for electrochemical devices such as a battery, especially a lithium secondary battery.

This invention further relates to a polyether polymer suitable for a composition for solid polymer electrolyte, and a process for producing the polyether polymer.

BACKGROUND ART

As an electrolyte for batteries, liquid or gel electrolytes have heretofore been used because of their ionic conductivity. An outer casing having a high mechanical strength must be used for batteries to avoid liquid leakage leading to damage of instruments. This poses a problem, for example, interferes with miniaturization or weight reduction of batteries.

To solve the above-mentioned problem, solid polymer electrolytes are being examined. Solid polymer electrolytes have good processability and pliability and therefore batteries can have various shapes without restriction. Further, solid polymer electrolytes have no fluidity and hence batteries possess a high safety.

For example, an attempt has been made proposed wherein an ethylene oxide-propylene oxide copolymer having incorporated therein a specific alkali metal salt is adopted as ion-conductive solid electrolyte (Japanese Unexamined Patent Publication [hereinafter abbreviated to "JP-A"] No. S61-83249, JP-A S63-136407 and JP-A H2-24975). However, higher ionic conductivity and higher mechanical strength are now desired. Further, solid polymer electrolytes used for batteries are handled usually in the form of film in the course of production. Therefore, it is required that solid polymer electrolytes have good film-forming property, and the film thickness is rendered as thin as possible to enhance the capacity of battery.

A solid polymer electrolyte must have high mechanical strength for the reduction of film thickness. For this purpose, a solid polymer electrolyte used is prepared by forming a film from a polyether polymer having crosslinkable reactive functional groups, and curing the film to effect crosslinking. For example, it is proposed in JP-A 2000-123632 that a highly polymeric solid electrolyte is prepared by copolymerizing ethylene oxide and propylene oxide with an oxirane compound having a functional group such as ethylenically unsaturated group, a reactive silicon-containing group, an epoxy group or a halogen group to produce a ring-opened polyether copolymer, and then, curing the polyether copolymer to effect crossinking. It is described in this patent publication that the crosslinked product obtained from the ring-opened polyether copolymer has good processability, good formability and high mechanical strength.

However, processability and formability are incompatible with mechanical strength, and hence, a crosslinked product having good and well-balanced processability, formability and mechanical strength is difficult to obtain.

Further, when the ring-opened polyether copolymer is prepared, another problem arises in that, since a monomer mixture containing a crosslinkable monomer is polymerized, crosslinking tends to undesirably occur during polymerization to give a copolymer containing a large amount of crosslinked product. The copolymer containing a large amount of crosslinked product has poor evenness of mechanical strength, and a thin film is difficult to produce from the copolymer by casting or extruding procedure. Further, crosslink density is not uniform in the film, and hence ionic conductivity is not uniform over the entire film. The film has poor surface smoothness, and hence, dendrite tends to be produced on the surface when charge and discharge of a battery are repeated.

A secondary battery provided with a solid electrolyte composed of the above-mentioned film made of the crosslinked product-containing polyether copolymer exhibits a considerably large reduction of battery performance with the lapse of time when charge and discharge of the battery are repeated.

DISCLOSURE OF THE INVENTION

A first object of the present invention is to provide a polyether polymer composition used for the production of a solid electrolyte, which has good processability for film-formation, and gives a solid electrolyte having good and even ionic conductivity, high mechanical strength and good surface smoothness.

A second object of the present invention is to provide a solid electrolyte having the above-mentioned beneficial properties.

A third object of the present invention is to provide a secondary battery having good battery performance and capable of being miniaturized, especially exhibiting good battery performance when charge and discharge are repeated.

A fourth object of the present invention is to provide a polyether polymer containing only a slight amount of crosslinked product and exhibiting good processability for film-formation, and giving a solid electrolyte having good and even ionic conductivity and high mechanical strength; and further provide a process for producing the polyether polymer.

The present inventors have found that application of shearing force to a polyether polymer under heated conditions using an extruder gives a polyether polymer containing a reduced amount of toluene insolubles and having good film-forming property, which is suitable for a solid electrolyte having good and even ionic conductivity and high mechanical strength. The present invention has been completed on the basis of this finding.

Thus, in a first aspect of the present invention, there is provided a composition for solid polymer electrolyte characterized by comprising a polyether polymer having a toluene insoluble content of not larger than 5% by weight, and an electrolyte salt compound soluble in the polyether polymer.

In a second aspect of the present invention, there is provided a composition for solid polymer electrolyte characterized by comprising a polyether polymer having a Mooney viscosity in the range of 3 to 190 and an electrolyte salt compound soluble in the polyether polymer; wherein said polyether polymer has been prepared by applying a shearing force under heated conditions using an extruder to a polyether polymer having a Mooney viscosity in the range of 10 to 200 so that the Mooney viscosity is reduced by 5 or more.

In a third aspect of the present invention, there is provided a solid polymer electrolyte made by curing the above-mentioned composition for solid polymer electrolyte to effect crosslinking.

In a fourth aspect of the present invention, there is provided a battery having the above-mentioned solid polymer electrolyte.

In a fifth aspect of the present invention, there is provided a polyether polymer having a Mooney viscosity in the range of 3 to 190, which has been prepared by applying a shearing force under heated conditions using an extruder to a polyether polymer having a Mooney viscosity in the range of 10 to 200 so that the Mooney viscosity is reduced by 5 or more.

In a sixth aspect of the present invention, there is provided a process for producing a polyether polymer having a Mooney viscosity in the range of 3 to 190, characterized in that a shearing force is applied under heated conditions using an extruder to a polyether polymer having a Mooney viscosity in the range of 10 to 200 so that the Mooney viscosity is reduced by 5 or more.

BEST MODE FOR CARRYING OUT THE INVENTION (1) Polyether Polymer

The composition for solid polymer electrolyte of the present invention comprises a polyether polymer and an electrolyte salt compound soluble in the polyether polymer. The polyether polymer as used herein includes (1) a polyether polymer having a toluene insoluble content of not larger than 5% by weight (which polymer is hereinafter referred to as "first polyether polymer" when appropriate), and (2) a polyether polymer having a Mooney viscosity in the range of 3 to 190 which has been prepared by applying a shearing force under heated conditions using an extruder to a polyether polymer having a Mooney viscosity in the range of 10 to 200 so that the Mooney viscosity is reduced by 5 or more (which polymer is hereinafter referred to as "second polyether polymer" when appropriate).

The first polyether polymer and the second polyether polymer, used in the present invention, (which polymers are hereinafter referred to collectively as "polyether polymer" when appropriate) are ring-opened polymers of oxirane compounds. The ring-opened polymers may be either a homopolymer derived from an oxirane compound, or a copolymer of at least two kinds of oxirane compounds or a copolymer of one or more kinds of oxirane compounds with other monomer.

The kind and amount of oxirane compound units in the polyether polymer are not particularly limited, but the polyether polymer preferably comprises, based on the total monomer units, 70% to 99% by mole of ethylene oxide units and 30% to 1% by mole of units derived from an oxirane monomer copolymerizable with ethylene oxide, wherein the polyether polymer contain not larger than 15% by mole, based on the total monomer units, of units derived from a crosslink-forming oxirane monomer.

The amount of ethylene oxide units in the polyether polymer is more preferably in the range of 75% to 97% by mole and especially preferably 80% to 95% by mole. When the amount of ethylene oxide units in the polyether polymer is in this range, the electrolyte salt compound exhibits good solubility in the polymer and the polymer is not easily crystallized, and therefore the ionic conductivity is enhanced.

The units derived from an oxirane monomer copolymerizable with ethylene oxide preferably contain as at least part thereof units derived from a crosslink-forming oxirane monomer. By the term "crosslink-forming oxirane monomer" as used herein, we mean an oxirane monomer characterized in that, when a polyether polymer having copolymerized therein this monomer is mixed with a crosslinking agent, and the mixture is heated or irradiated with active radiation such as ultraviolet rays, visible light rays or electron rays, units of the oxirane monomer are capable of reacting with the crosslinking agent to form a crosslinked structure. The polyether polymer having introduced therein crosslink-forming oxirane monomer units gives a solid electrolyte film having enhanced strength due to the crosslinking of polymer.

As specific examples of the crosslink-forming oxirane monomer, there can be mentioned epihalohydrins such as epichlorohydrin, epibromohydrin, epiiodohydrin, epifluorohydrin and β-methylepichlorohydrin; halogen-substituted oxirane polymers such as p-chlorostyrene oxide and dibromophenyl glycidyl ether; and ethylenically unsaturated epoxides, which include ethylenically unsaturated glycidyl ethers such as vinyl glycidyl ether, allyl glycidyl ether, butenyl glycidyl ether and o-allylphenyl glycidyl ether; monoepoxides of diene or polyene such as butadiene monoepoxide, chloroprene monoepoxide, 4,5-epoxy-2-pentene, 3,4-epoxy-1-vinylcyclohexene and 1,2-epoxy-5,9-cyclododecadiene; alkenylepoxides such as 3,4-epoxy-1-butane, 1,2-epoxy-5-hexene and 1,2-epoxy-9-decene; and glycidyl esters of an ethylenically unsaturated carboxylic acid such as glycidyl acrylate, glycidyl methacrylate, glycidyl crotonate, glycidyl 4-heptonoate, glycidyl sorbate, glycidyl linoleate, glycidyl 4-methyl-3-pentenoate and 3-cyclohexenecarboxylic acid glycidyl ester, and 4-methyl-3-cyclohexenecarboxylic acid glycidyl ester. The crosslink-forming oxirane monomer may be used either alone or as a mixture of at least two thereof. Of these crosslink-forming oxirane monomers, halogen-substituted oxirane monomers and ethylenically unsaturated glycidyl ethers are preferable. Allyl glycidyl ether and epichlorohydrin are especially preferable.

The oxirane monomers copolymerizable with ethylene oxide may include non-crosslinkable monomers. As specific examples of the non-crosslinkable monomers, there can be mentioned alkylene oxides such as propylene oxide, 1,2-epoxybutane, 1,2-epoxyisobutane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane and 1,2-epoxyeicosane; alkyl glycidyl ethers such as methyl glycidyl ether, ethyl glycidyl ether and butyl glycidyl ether; and aryl epoxides such as styrene oxide and phenyl glycidyl ether. These oxirane monomers may be used either alone or as a combination of at least two thereof. In view of high polymerizability, propylene oxide and 1,2-epoxybtane are especially preferable.

Diepoxy compounds such as butadiene diepoxide, ethylene glycol diglycidyl ether, polyethylene glycol diglycidyl ether and vinylcyclohexene diepoxide can also be copolymerized. By copolymerization of these diepoxy compounds, a branched structure can be introduced in a polyether polymer.

The amount of units of oxirane monomer copolymerized with ethylene oxide is in the range of 1% to 30% by mole, preferably 2% to 20% by mole and more preferably 3% to 15% by mole, based on the total monomer units in the copolymer.

The content of units of crosslink-forming oxirane monomer among the units of oxirane monomers copolymerized with ethylene oxide is in the range of 0% to 15% by mole, preferably 1% to 13% by mole and more preferably 2% to 11% by mole, based on the total monomer units. When the content of units of crosslink-forming monomer is too small, a crosslink is substantially not formed in the polyether polymer and the resulting solid electrolyte tends to have poor mechanical strength. In contrast, when the content of units of crosslink-forming monomer is too large, ionic conductivity is reduced and the resulting solid electrolyte has poor electrolyte performance.

The polyether polymer can be produced by subjecting the specified oxirane compounds to a ring-opening polymerization, for example, by a solution polymerization procedure or a solvent slurry polymerization procedure.

A polymerization catalyst used is not particularly limited provided that it is generally used for polymerization for the production of a polyether polymer. The polymerization catalyst includes, for example, a catalyst prepared by reacting an organic aluminum compound with water and acetyl acetone (Japanese Examined Patent Publication [hereinafter abbreviated to as "JP-B"] No. S35-15797), a catalyst prepared by reacting triisobutylaluminum with phosphoric acid and triethylamine (JP-B S46-27534), a catalyst prepared by reacting triisobutylaluminum with an organic acid salt of diazabicyloundecene, and phosphoric acid (JP-B S56-51171), a catalyst comprised of a partially hydrolyzed product of an aluminum alkoxide and an organic zinc compound (JP-B S43-2945), a catalyst comprised of an organic zinc compound and a polyhydric alcohol (JP-B S45-7751), and a catalyst comprised of a dialkylzinc and water (JP-B S36-3394). Of these, the catalyst prepared by reacting triisobutylaluminum with an organic acid salt of diazabicyloundecene, and phosphoric acid is preferable because a polymer having an extremely reduced toluene insoluble content can be obtained.

A polymerization solvent used includes, for example, aromatic hydrocarbons such as benzene and toluene, straight-chain saturated hydrocarbons such as n-pentane and n-hexane, and alicyclic hydrocarbons such as cyclopentane and cyclohexane.

As the polymerization procedure, a solvent slurry polymerization procedure using a polymerization solvent such as n-pentane, n-hexane or cyclopentane is preferable. In the solvent slurry polymerization procedure, the polymerization catalyst is preferably pre-treated with a monomer giving a polymer insoluble in the solvent and a monomer giving a polymer soluble in the solvent to obtain a stable polymerization system. The pre-treatment of the polymerization catalyst can be carried out by mixing catalyst ingredients with small amounts of monomers and aging the mixture at a temperature of 0° C. to 100° C., preferably 30° C. to 50° C., for 10 to 30 minutes. By using the thus-aged catalyst, undesirable deposition of polymer on the inner wall of a polymerization vessel can be avoided.

The polymerization reaction can be carried out at a temperature of 0° C. to 100° C., preferably 30° C. to 70° C., by an appropriate procedure selected from, for example, batchwise, semi-batchwise and continuous polymerization procedures.

A manner in which the polymer is taken from the polymer slurry after polymerization, a manner for drying a polymer, and a manner for preparing a commercial product of polymer are not particularly limited, and an appropriate manner can be adopted. For example, as-obtained polymer particles are subjected to filtration or centrifugal separation, and then, are fed directly into an extruder where the polymer particles are dried and simultaneously a shearing force is applied thereto. Alternatively the as-filtered polymer particles can be vacuum-dried in a filter while being stirred, to directly obtain the final polymer particles.

(1)-1 First Polyether Polymer

The first polyether polymer used in the present invention is a polyether polymer having a toluene insoluble content of not larger than 5% by weight. By the term "toluene insoluble content" as used herein, we mean the ratio of amount by weight of insoluble polymer in toluene to the total amount by weight of polymer as measured before incorporation in toluene. The toluene insoluble content is determined as follows. 0.2 g of a polyether polymer and 100 ml of toluene are mixed together, and the mixture is shaken for 30 minutes at a temperature of 40° C. to completely dissolve the soluble polymer. Then the solution is filtered through a 150 mesh wire gauze. The insoluble residue on the filter is dried and weighed [weight (a)]. The toluene insoluble content is expressed by the ratio [(a)/(b)] of the weight (a) of dried insolubles to the weight (b) of polymer as measured before incorporation with toluene.

The toluene insoluble content in the first polyether polymer is preferably not larger than 4%, more preferably not larger than 3% by weight. If the toluene insoluble content is too large, the mechanical strength is not uniform and hence a thin film is difficult to make, for example, by a casting method or an extrusion method. Further, when the film is cured, crosslink density in the cured film are not uniform, and hence, ionic conductivity is not uniform over the entire film, and dendrite tends to be produced on the surface when charge and discharge of a battery are repeated. The film has poor surface smoothness and thus adhesion of electrolyte to an electrode is poor and battery performance is deteriorated.

The method for producing the polyether polymer having a low toluene soluble content is not particularly limited. For example, a method wherein a polyether polymer is dissolved in toluene, and the thus-prepared solution is filtered to remove insolubles, or a specific polymerization method can be adopted.

The first polyether polymer usually has a Mooney viscosity in the range of 3 to 190, and this polymer usually has a reduced viscosity in the range of 0.5 to 15 dl/g, preferably 0.6 t 10 dl/g and more preferably 0.7 to 8 dl/g. Reduced viscosity of the polyether polymer is determined from the viscosity of a 2% polymer solution in toluene and the viscosity of toluene, which viscosities are measured at 25° C. by an Ostwald viscometer type OA. In the case when the viscosity is in this range, the polymer exhibits good fluidity when it is shaped into a film, the film has good retention of shape, and the cured solid electrolyte film has good pliability and high mechanical strength.

(1)-2 Second Polyether Polymer

The second polyether polymer used in the present invention is a polymer having a Mooney viscosity in the range of 3 to 190 which has been prepared by applying a high shearing force under heated conditions using an extruder to a polyether polymer having a Mooney viscosity in the range of 10 to 200 so that the Mooney viscosity is reduced by 5 or more.

The polyether polymer before application of high shearing force has a Mooney viscosity in the range of 10 to 200 and a reduced viscosity in the range of 0.7 to 20 dl/g, preferably 0.8 t 15 dl/g and more preferably 1 to 10 dl/g.

By the treatment of applying high shearing force, the Mooney viscosity of polyether polymer is decreased from a value in the range of 10 to 200 by 5 points or more to a value in the range of 3 to 190. Simultaneously the reduced viscosity of polyether polymer is decreased usually by at least 0.2 point, preferably at least 0.3 point and more preferably at least 0.5 point, usually to a value in the range of 0.5 to 15 dl/g, preferably 0.6 to 10 dl/g and more preferably 0.7 to 8 dl/g. When a high shearing force is applied to an extent such that the viscosity is decreased as mentioned above, a polyether polymer having good processability, film-forming property and high mechanical strength can be obtained with good controllability.

The treatment of applying high shearing force is usually carried out substantially in the absence of an oxygen donor such as oxygen, a peroxide and a nitrate at a shearing rate of 500 to 5,000 S$^{-1}$, preferably 800 to 5,000 S$^{-1}$, and a temperature of 100 to 380° C., preferably 100 to 340° C. and more preferably 120 to 280° C. To conduct the high-shearing-modulus treatment with high productivity, the shearing rate is preferably in the range of 2,000 to 5,000 S$^{-1}$. The substantial absence of an oxygen donor means that an oxygen donor is not co-present, and does not always limit the treatment to the mode where it is carried out in an inert gas atmosphere such as nitrogen gas.

The polyether polymer before the high-shearing modulus treatment may have either a large or small toluene insoluble content (which is determined as mentioned above), but, the toluene insoluble content of polyether polymer can be drastically reduced by the high-shearing-modulus treatment. That is, even when a polyether polymer having a large toluene insoluble content is used, the toluene insoluble content of polymer is reduced by the high-shearing modulus treatment preferably to value not larger than 5% by weight, more preferably not larger than 4% by weight and especially preferably not larger than 3% by weight. When the toluene insoluble content of treated polymer is low, a thin film can easily be shaped, for example, by a casting method or an extrusion method, and when the shaped film is cured, crosslink density in the cured film are uniform, and hence, ionic conductivity is uniform over the entire film. Further, the film has good surface smoothness and thus adhesion of electrolyte to an electrode is enhanced and battery performance is improved.

A preferable apparatus used for the high-shearing modulus treatment is an extruder provided with a single screw or multi-screws. A twin-screw extruder is especially preferable. A twin-screw extruder provided with completely intermeshing screws rotating in the same direction is most preferable. The screw used preferably has two or more flight channels to give a high shearing force. A double or triple flights screw is especially preferable. More specific details are as follows.

The extruder preferably has an L/D (length/diameter) ratio of at least 30, more preferably in the range of 30 to 50. If the L/D ratio is smaller than 30, a cooling zone having a substantial length cannot be provided, with the result that the polymer cannot be cooled to the desired extent, i.e., the polymer is extruded at a temperature higher than the desired temperature. The extruded polymer is difficult to take off, and the polymer is liable to be deteriorated or an undesirable crosslinked product tends to be produced. That is, the polymer has a high viscosity, and is highly exothermic under a high shear and readily reaches a high temperature. Therefore a cooling zone of the desired length should be provided in the screw to sufficiently cool the polymer before it is extruded from the extruder. The temperature of polymer at the outlet of extruder is preferably not higher than 260° C., more preferably not higher than 170° C.

In general, an extruder constituted by a plurality of barrels arranged in series is used. The first zone of extruder following a polymer feed hopper and having a length of ⅓ of the entire length of extruder is a melting zone for melting the polymer. In the melting zone, the screw is constituted fundamentally by traveling sections so that the polymer is gradually compressed. The temperature in the melting zone is preferably set so that the melting is conducted in the desired fashion. Practically the temperature is set so that it is elevated in several steps to the temperature set in the succeeding kneading zone.

In the succeeding zone followed by the first zone and having a length of ⅓ of the entire length of extruder, a screw having kneading sections is utilized for applying to polymer a high shearing force produced by the screw at a predetermined high temperature. The temperature set in the high-shearing force-applying zone is preferably in the range of 100 to 340° C., more preferably 120 to 280° C. As the temperature is higher, the Mooney viscosity is reduced to a greater extent. However, too high set temperature leads to an undesirable increase of the polymer temperature with the result that the polymer is extruded before it is cooled to the desired temperature, and deterioration of polymer and production of crosslinked products are caused. Temperature may be elevated by heat generation due to application of shearing force, but, this procedure is not preferable because the polymer cannot be treated with a high stability in this zone of extruder.

In the succeeding zone followed by the high-shearing force-applying zone and having a length of ⅓ of the entire length of extruder, the polymer heated to a high temperature is cooled. A vent is provided in this zone of extruder to remove unreacted monomers and volatile side-reaction products under a reduced pressure. Finally the polymer having a reduced Mooney viscosity is extruded through an extrusion head. The cooling zone of screw is preferably constituted by traveling sections giving a low shearing force so that the polymer is sufficiently cooled. The residence time of polymer in this zone can be varied by a screw pitch. The temperature is set in the range of 100 to 250° C. The vent zone is maintained at a reduced pressure in the range of 1.3 to 100 kPa, preferably 90 to 100 kPa. But, a normal pressure may be adopted.

The degree of reduction of Mooney viscosity can be controlled mainly by varying the shear rate. The desired shear rate for reducing the Mooney viscosity to the desired extent is usually in the range of 500 to 5,000 S$^{-1}$. The reduction of Mooney viscosity varies depending upon not only the shear rate but also other factors such as temperature and time. Therefore, the shear rate should appropriately chosen in consideration of these factors so that the desired low Mooney viscosity is obtained. The optimum shear rate can easily be determined by experiments.

(2) Composition for Solid Polymer Electrolyte, and Solid Polymer Electrolyte

The composition for solid polymer electrolyte of the present invention comprises the above-mentioned first or second polyether polymer, and an electrolyte salt compound soluble the polyether polymer.

The electrolyte salt compound used is not particularly limited provided that it is soluble in the polyether polymer or a crosslinked product of the polymer, and, as specific examples thereof, there can be mentioned salts of an anion selected from fluorine ion, chlorine ion, bromine ion, iodine ion, perchlorate ion, thiocyanate ion, trifluorosulfonimide ion, tetrafluoroborate ion, nitrate ion, AsF6$^-$, PF6$^-$, stearylsulfonate ion, octylsulfonate ion, dodecylbenzenesulfonate ion, naphthalenesulfonate ion, dodecylnaphtalenesulfonate ion and 7,7,8,8-tetracyano-p-quinodimethane ion, with an alkali metal cation or alkaline earth metal cation, selected form cations of Li, Na, K, Rb, Cs, Mg, Ca and Ba. These alkali metal salts and alkaline earth metals may be used either alone or as a mixture of at least two thereof.

The amount of the electrolyte salt compound is such that the ratio of mole number of the electrolyte salt compound to mole number of total ether oxygen in the polyether polymer is usually in the range of 0.001 to 5, preferably 0.005 to 3 and more preferably 0.01 to 1. When the amount of electrolyte salt compound is too small, the battery performance is not satisfactory. In contrast, when the amount of electrolyte salt compound is too large, the polymer has poor processability and shaping property, and the solid electrolyte film has poor mechanical strength and low ionic conductivity.

The solid polymer electrolyte of the present invention is a crosslinked product of the above-mentioned polymer composition. The crosslinking of the polymer composition is preferably conducted by a process wherein the polyether polymer is mixed with an electrolyte salt compound, and a crosslinking agent and other ingredients, the mixture is shaped into a film, and then the film is cured to effect crosslinking. The crosslinking procedure is not particularly limited, and, as examples of the crosslinking procedure, there can be mentioned a procedure wherein a crosslinking agent such as a radical crosslinking agent including an organic peroxide and an azo compound, sulfur or a sulfur donor, a mercaptotriazine and a thiourea, is incorporated in the polymer composition, and the crosslinking agent-incorporated polymer composition is heated, or is irradiated with active radiation such as ultraviolet rays, visible light rays or electron rays. Of these, incorporation of radical crosslinking agents such as an azo compound, and an organic peroxide, and irradiation with ultraviolet rays, visible light rays and electron rays are preferable.

The sulfur donor includes, for example, thiurams such as morpholine disulfide and tetramethylthiuram disulfide.

The organic peroxide includes conventional organic peroxide crosslinking agents, and, as specific examples thereof, there can be mentioned ketone peroxides such as methyl ethyl ketone peroxide and cyclohxanone peroxide; peroxy ketals such as 1,1-bis(t-butylperoxy)-3,3,5-trimethylcyclohexane, 2,2-bis(t-butylperoxy)octane and n-butyl-4,4-bis-(t-butylperoxy)valerate; hydroperoxides such as t-butylhydroperoxide, cumene hydroperoxide and 2,5-dimethylhexane-2,5-dihydroperoxide; dialkyl peroxides such as di-tert-butyl peroxide, tert-butyl cumyl peroxide, dicumyl peroxide, α,α'-bis(tert-butylperoxy-m-isopropyl) benzene, 2,5-dimethyl-2,5-bis(tert-butylperoxy)hexane and 2,5-dimethyl-2,5-bis(tert-butylperoxy)hexyne; diacyl peroxides such as benzoyl peroxide; and peroxy esters such as tert-butylperoxy aetate.

The azo compound includes conventional azo compound crosslinking agents, and, as specific examples thereof, there can be mentioned azo nitrile compounds such as 2,2'-azobisisobutyronitrile, 2,2'-azobis(2-methylbutyronitrile), 2,2'-azobis(4-methoxy-2,4-dimethylvaleronitrile), 2,2'-azobis-(2,4-dimethylvaleronitrile), 1,1'-azobis(cyclohexane-1-carbonitrile), 2-(carbamoylazo) isobutyronitrile and 2-phenylazo-4-methoxy-2,4-dimethylvaleronitrile; azo amide compounds such as 2,2'-azobis(2-methyl-N-[1,1-bis(hydroxymethyl)-2-hydroxyethyl]propionamide, 2,2'-azobis{2-methyl-N-[1,1-bis(hydroxymethyl)ethyl]-propionamide and 2,2'-azobis[2-methyl-N-(2-hydroxyethyl)-propionamide]; and azo amidine compounds such as 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(hydroxyphenyl)-2-methylpropionamidine] dihydrochloride, 2,2'-azobis[2-methyl-N-(phenylmethyl) propionamidine] dihydrochloride, 2,2'-azobis[2-methyl-N-(2-propenyl)propionamidine] dihydrochloride, 2,2'-azobis (2-methylpropionamidine) dihydrochloride, and 2,2'-azobis [N-(2-hydroxyethyl)-2-methylpropionamidine] dihydrochloride.

The thiourea includes, fro example, thiourea, dibutylthiourea and triethylthiourea.

The amount of crosslinking agent is such that the lower limit thereof is preferably 0.1 part by weight, more preferably 0.2 part by weight and especially preferably 0.3 part by weight, and the upper limit thereof is preferably 10 parts by weight, more preferably 7 parts by weight and especially preferably 5 parts by weight, based on 100 parts by weight of the polyether polymer.

In the present invention, if needed, a crosslinking aid can be used in combination with the crosslinking agent. The crosslinking aid used is not particularly limited. The crosslinking aid can be used either alone or as a combination of at least two thereof. The amount of crosslinking aid is preferably not larger than 20 parts by weight, more preferably not larger than 15 parts by weight and especially preferably 10 parts by weight, based on 100 parts by weight of the polyether polymer. If the amount of crosslinking aid is too large, the rate of crosslinking is too rapid, blooming to the surface of crosslinked product tends to occur, and the crosslinked product is liable to be too hard.

As the crosslinking aid used in combination with the organic peroxide crosslinking agent, there can be mentioned metal oxides such as zinc oxide and magnesium oxide; metal hydroxide such as calcium hydroxide; metal carbonate salts such as zinc carbonate and basic zinc carbonate; fatty acids such as stearic acid and oleic acid; and fatty acid metal salts such as zinc stearate and magnesium stearate. Further, compounds having at least two crosslink-forming unsaturated bonds in the molecule can also be used in combination with the organic peroxide crosslinking agent. As specific examples of such compounds, there can be mentioned ethylene dimethacrylate, diallyl phthalate, N,N-m-phenylene dimaleimide, triallyl isocyanurate, trimethylolpropane trimethacrylate and liquid vinyl polybutadiene.

When the crosslinking is effected by irradiation with active radiation such as ultraviolet rays and electron rays, a photo-crosslinking agent can be added, if needed. The photo-crosslinking agent includes, for example, benzyldimethylketal, trimethylsylilbenzophenone, benzoin, 4-methoxybenzoohenone and benzoin methyl ether anthraquinone.

To enhance the ionic conductivity, a plasticizer may be added to the solid electrolyte of the present invention. The plasticizer includes organic solvents, and, as specific examples thereof, there can be mentioned non-protonic esters such as propylene carbonate, ethylene carbonate and butylenes carbonate; and non-protonic ethers such as tetrahydrofuran, ethylene glycol diethyl ether. Further, polyalkylene glycol derivatives having a molecular weight of not larger than 5,000 may also be used as a plasticizer.

No limitation is imposed to the process for producing the solid electrolyte of the present invention, but, a process is usually adopted wherein the above-mentioned ingredients are mixed together by an appropriate mixing procedure such as, for example, roll mixing, Banbury mixing, screw mixing and solution mixing, and the mixture is shaped into a film and then cured. The order in which the ingredients are mixed is not particularly limited, but, it is preferable that ingredients incapable of being easily degraded or decomposed by heat are thoroughly mixed, and thereafter ingredients capable of being easily reacted or decomposed by heat (for example, crosslinking agent and crosslinking accelerator) are mixed together within a short time.

In the case when a plasticizer is added, it can be added over a long time after the film-formation and curing, so that the plasticizer gradually permeates the electrolyte, or a plasticizer can be added when the above-mentioned ingredients are mixed together.

In the case when the high-shearing modulus treatment of a polyether polymer according to the present invention is carried at a temperature at which thermal decomposition of the above-mentioned ingredients does not occur, the above-mentioned ingredients can be added to a polyether polymer simultaneously with the high-shearing modulus treatment of polymer.

The method for shaping the crosslinkable composition for a solid polymer electrolyte of the present invention, and the method for crosslinking the shaped product are not particularly limited, but, an extrusion method is preferable. Depending upon the particular methods of shapning and crosslinking and the particular shape of the crosslinked product, it is preferable to adopt a method wherein shapning and crosslinking are carried out simultaneously, or a method wherein shaping is first carried out and thereafter crosslinking is carried out.

Battery

The battery of the present invention is provided with the above-mentioned solid polymer electrolyte. The above-mentioned solid polymer electrolyte has good processability and pliability, and therefore the battery can have various shapes without restriction. Further, the solid polymer electrolyte has no fluidity and hence the battery is beneficial in that it is safe and there is no fear of liquid leakage leading to damage of instruments. Therefore, the solid polymer electrolyte can be provided in various types of batteries. The kinds of batteries are not limited, and, as examples of the battery, there can be mentioned alkali metal batteries such as lithium, potassium and sodium batteries; halogen salt batteries such as zinc-silver chloride battery, magnesium-silver chloride battery and magnesium-copper chloride battery; and proton conductive batteries such as nickel-hydrogen battery. Of these, a lithium ion secondary battery is preferable because its service capacity is high and lithium ion has a high conductivity within the solid electrolyte.

A lithium ion secondary battery provided with a separator containing the solid polymer electrolyte of the present invention, together with a positive electrode and a negative electrode, is especially preferable. The separator can be either a film comprised singly of the solid polymer electrolyte and sandwiched between a positive electrode and a negative electrode, or a composite structure made by coating a positive electrode or a negative electrode with a solution of the solid polymer electrolyte and then curing the coating of solid electrolyte. As a separator material, porous articles such as polypropylene non-woven fabric and polyolefin microporous film can be used in combination with the solid polymer electrolyte.

Active materials used for a positive electrode include transition metal compounds and composite metal oxides, which are capable of occluding and releasing lithium, such as those which are represented by the formulae: $Li_xM_yX_p$ or $Li_xM_yN_zX_p$ wherein M is at least one metal selected from Co, Li, Al, Sn and Mn; N is at least one metal selected from Al and Sn; X represents an oxygen atom or a sulfur atom; and x, y, z and p are numbers satisfying the formulae: $1.1 \geq x \geq 0.05$, $4 \geq y \geq 0.85$, $2 \geq z \geq 0.5$ and $5 \geq p \geq 1.5$, respectively. Active materials used for a negative electrode include alloys, oxides and carbon materials, which are capable of occluding and releasing lithium and lithium metal. The positive electrode and the negative electrode may be of a film form made by a procedure wherein the above-mentioned active materials are mixed together with the polyether polymer of the present invention as a binder, and the mixture is subjected to crosslinking and shaping into a film.

EXAMPLES

Now the invention will be described more specifically by the following examples and comparative examples, that by no means limit the scope of the invention.

In these examples and comparative examples, solvents and monomers were used after they were subjected to deairing and dehydration treatments; and all of the operations were carried out under dehydrated conditions in an inert gas atmosphere.

Parts and % in the examples and comparative examples are by weight unless otherwise specified.

(1) Mooney Viscosity

Mooney viscosity ($ML_{1+4}$, 100° C.) of a polyether polymer was measured according to JIS K6300.

(2) Reduced Viscosity

Reduced viscosity of a polyether polymer was determined from the viscosity of a 2% polymer solution in toluene and the viscosity of toluene, which viscosities were measured at 25° C. by an Ostwald viscometer type OA.

(3) Composition of Polyether Polymer

Contents of monomer units in a polyether polymer were determined by $^1$H-NMR measurement.

(4) Toluene-insoluble content 0.2 g of a polyether polymer and 100 ml of toluene were placed in a 100 ml Erlenmeyer flask, and the content was shaken at 40° C. for 3 hours to completely dissolve a soluble matter. Then the solution was filtered through a 150 mesh wire gauze to remove the toluene soluble matter. The insolubles on the wire gauze were dried and weighed. The toluene insoluble content (% by weight) was determined as the ratio of the weight of dried insloubles to the weight of polymer as measured before dissolution of the soluble matter.

(5) Processability (Die Swell Evaluated by Garve Die Extrusion Test)

Die swell (%) was determined by extruding a polyether polymer through a Garve die according to ASTM D-2230-77.

(6) Surface State of Film

Surface state of a film was visually observed and evaluated according to the following three ratings.

A: Surface was completely smooth.

B: Surface texture was partly rough.

C: Melt facture occurred when a polymer was shaped into a film.

(7) Strength of Film

Both ends of a film having a size of 7 mm width and 30 mm length were pinched by fingers and drawn. The strength of film was evaluated by the state of breaking and expressed by the following three ratings.

A: Film could be sufficiently drawn and was not easily broken.

B: Film was relatively easily broken.

C: Film was drawn only to a very small extent.

(8) Ionic Conductivity

Ionic conductivity (S/cm) of a polymer film was determined by a complex impedance method wherein a polymer film was vacuum-dried at 30° C. and below 0.1 kPa for 72 hours, and then, it was sandwiched between platinum electrodes and tested at a voltage of 0.5 V and a frequency range of 5 Hz to 13 Hz by an alternating current method.

Reference Example 1
(Production of Polyether Polymer A)

An autoclave equipped with a stirrer was dried and flushed with nitrogen gas, and then, charged with 158.7 parts of triisobutylaluminum, 1,170 parts of toluene and 296.4 parts of diethyl ether. The inside temperature was set at 30° C., and 23.5 parts of phosphoric acid was added at a constant rate over a period of 10 minutes while being stirred. Then, 12.1 parts of triethylamine was added, and the mixture was maintained at 60° C. for 2 hours to give a catalyst solution.

An autoclave equipped with a stirrer was dried and flushed with nitrogen, and was charged with 2,100 parts of n-hexane and 73.1 parts of the above-mentioned catalyst solution. The inside temperature was set at 30° C., and 4 parts of ethylene oxide was added while being stirred, to carry out a reaction. Then, 8.5 parts of an equal weight monomer mixture of ethylene oxide and propylene oxide was added to carry out a polymerization for producing a seed.

The inside temperature was set at 60° C., and then, a mixed solution of 340 parts (90% by mole) of ethylene oxide, 14.9 parts (3% by mole) of propylene oxide, 68.4 parts (7% by mole) of allyl glycidyl ether and 300 parts of n-hexane was continuously added to the seed-containing polymerization liquid at a constant rate over a period of 5 hours. After completion of addition, a polymerization was carried out for 2 hours. The polymerization conversion was 98%. To the resultant polymer slurry, 42.4 parts of a 5% solution in toluene of 4,4'-thiobis(6-tert-butyl-3-methylphenol) as an antioxidant was added with stirring. The mixture was vacuum-dried at 40° C. to give a clean powdery polymer A.

Composition and properties of polyether polymer A are shown in Table 1.

Reference Example 2
(Production of Polyether Polymer B)

An autoclave equipped with a stirrer was dried and flushed with nitrogen gas, and then, charged with 158.7 parts of triisobutylaluminum, 1,170 parts of toluene and 296.4 parts of diethyl ether. The inside temperature was set at 30° C., and 31 parts of phosphoric acid was added at a constant rate over a period of 10 minutes while being stirred. Then, 12.1 parts of triethylamine was added and the mixture was maintained at 60° C. for 2 hours to give a catalyst solution.

Using the above-mentioned catalyst solution, a powdery polymer was produced by the same polymerization procedures as described in Reference Example 1 with all other conditions remaining the same.

Composition and properties of the thus-obtained polyether polymer B are shown in Table 1.

Reference Example 3
(Production of Polyether Polymer C)

A pressure-resistant glass bottle provided with a stopper was flushed with nitrogen gas, and then charged with 180 parts of toluene and 60 parts of triisobutylaluminum. Then the glass bottle was placed in an ice-water bath, and 224.2 parts of diethyl ether was added thereto. While being cooled with ice-water, 8.89 parts of phosphoric acid was added, and stirring was continued. At that time, the pressure inside the bottle was depressed on occasion to avoid the pressure increase due to a reaction between triisobutylaluminum and phosphoric acid. Then, 8.98 parts of formic acid salt of 1,8-diaza-bicyclo(5,4,0)undecene-7 was added, and the reaction mixture was maintained at 60° C. for 1 hour in a warm water bath to give a catalyst solution.

Using the above-mentioned catalyst solution, a powdery polymer was produced by the same polymerization procedures as described in Reference Example 1 with all other conditions remaining the same.

Composition and properties of the thus-obtained polyether polymer C are shown in Table 1.

Reference Example 4
(Production of Polyether Polymer D)

A catalyst solution was prepared by the same procedures as described in Reference Example 3 except that the amount of phosphoric acid was changed to 13.5 parts with all other conditions remaining the same.

An autoclave equipped with a stirrer was dried and flushed with nitrogen gas, and then, charged with 2,100 parts of n-hexane and 73.1 parts of the above-mentioned catalyst solution. The inside temperature was set at 30° C., and 6 parts of a monomer mixture of 4 parts of ethylene oxide and 6 parts of propylene oxide was added to carry out a polymerization for producing a seed.

The inside temperature was set at 60° C., and then, a mixed solution of 250 parts (89.5% by mole) of ethylene oxide, 30 parts (7% by mole) of propylene oxide, 20 parts (3.5% by mole) of allyl glycidyl ether and 300 parts of n-hexane was continuously added to the seed-containing polymerization liquid at a constant rate over a period of 5 hours. After completion of addition, a polymerization was carried out for 2 hours. The polymerization conversion was 96%. To the resultant polymer slurry, 42.4 parts of a 5% solution in toluene of 4,4'-thiobis(6-tert-butyl-3-methylphenol) as an antioxidant was added with stirring. The mixture was vacuum-dried at 40° C. to give a powdery polymer D.

Composition and properties of the thus-obtained polyether polymer D are shown in Table 1.

Reference Example 5
(Production of Polyether Polymer E)

Polyether polymer A produced in Reference Example 1 was dissolved in toluene to prepare a 3% polymer solution in toluene. The polymer solution was filtered through a 80 mesh wire gauze to remove toluene-insoluble matter. The filtrate was vacuum-dried at 40° C. for 24 hours so as to be directly dried to remove toluene.

Composition and properties of the thus-obtained polyether polymer E are shown in Table 1.

Comparative Example 1
(Production of Solid Electrolyte Film and Evaluation Thereof)

To 3,000 parts of polyether polymer A produced in Reference Example 1, bistrifluoromethylsulfonylimidelithium was added in an amount such that the ratio of the amount by mole of the electrolyte salt to the amount by mole of oxygen atom in the polyether polymer was 0.05. Further 3 parts of benzyldimethylketal as a photo-curing agent was added and the mixture was thoroughly stirred. The mixture was extruded through a twin-screw extruder at a screw temperature of 80° C., a revolution number of 80 ppm and a die temperature of 100° C. into a film. The film was continuously adhered on a polypropylene (PP) film and irradiated with ultraviolet light to be thereby cured. The thus-formed solid electrolyte film was separated from the PP film.

The film had a thickness of 40 μm, and its surface was not smooth. Strength and ionic conductivity of the film were poor as shown in Table 1.

Comparative Example 2
(Production of Solid Electrolyte Film and Evaluation Thereof)

A solid electrolyte film was produced and its properties were evaluated by the same procedures as described in Comparative Example 1 wherein polyether polymer B produced in Reference Example 2 was used instead of polyether polymer A with all other conditions remaining the same.

The surface of the solid electrolyte film was not smooth. Strength and ionic conductivity of the film were poor as shown in Table 1.

Examples 1 to 3
(Production of Solid Electrolyte Films and Evaluation Thereof)

Solid electrolyte films were produced and their properties were evaluated by the same procedures as described in Comparative Example 1 wherein polyether polymers C, D and E produced in Reference Examples 3 to 5 were used instead of polyether polymer A with all other conditions remaining the same.

The solid electrolyte films had a smooth surface. Strength and ionic conductivity of the films are shown in Table 1.

Examples 4 to 6
(Production of Solid Electrolyte Films and Evaluation Thereof)

Polyether polymer A produced in Reference Example 1 was subjected to a high-shearing modulus treatment using a twin-screw extruder under the following conditions.

Twin-screw extruder: "BT-40" made by Plastic Engineering Research Co., screw diameter: 38 mm, screw length: 1,600 mm, L/D: 42, constitution: 7 barrels.

Extruding conditions: extrusion rate: 7 kg/hour, set temperatures: barrel 1 (feed zone): 100° C., barrel 2 (melting zone): 200° C., barrels 3 to 6 (kneading and shearing zone): 240° C., barrel 7 (kneading and deairing zone): 160° C., 96 kPa.

In Examples 4 to 6, the high-shearing-modulus-treating temperature, the revolution number of screw, the residence time in barrels 1 to 7, and the rate of shearing are as shown in Table 1.

Mooney viscosity, toluene-insoluble content, reduced viscosity and die swell of the high-shearing-modulus-treated polymers were evaluated. The results are shown in Table 1.

A curable composition was prepared using each of the high-shearing-modulus-treated polymers and extruded into a film by the same procedures and conditions as those employed in Comparative Example 1. Properties of the film were evaluated. The results are shown in Table 1.

Example 7
(Production of Solid Electrolyte Film and Evaluation Thereof)

Polyether polymer B produced in Reference Example 2 was treated for applying a high-shearing-force by the same procedures as employed in Example 4 wherein all of the conditions remained the same except that polyether polymer B was used instead of polyether polymer A. Mooney viscosity, toluene-insoluble content and die swell of the high-shearing-modulus-treated polymer were evaluated. The results are shown in Table 1.

A curable composition was prepared using the high-shearing-modulus-treated polymer and extruded into a film by the same procedures and conditions as those employed in Comparative Example 1. Properties of the film were evaluated. The results are shown in Table 1.

Example 8
(Production of Solid Electrolyte Film and Evaluation Thereof)

A solid electrolyte film of a polyether polymer was made by the same procedures as described in Comparative Example 1 except that polyether polymer C produced in Reference Example 3 was used instead of polyether polymer A, and the extrusion conditions for making the film were changed as follows. Screw temperature: 120° C., screw revolution number: 200 rpm, die temperature: 140° C. All other conditions remained the same. Properties of the film were evaluated. The solid electrolyte film had a smooth surface. Strength and ionic conductivity of the film are shown in Table 1.

To examine the change of properties of the polyether polymer due to a high-shearing-modulus treatment, the polymer was extruded under the same conditions as employed above for film-formation except that bistrifluoromethylsulfonylimidelithium and benzyldimethylketal were not used. Mooney viscosity, toluene-insoluble content, reduced viscosity and die swell of the high-shearing-modulus-treated polymer were evaluated. The results are shown in Table 1.

Example 9
(Manufacture of Lithium Ion Secondary Battery and Evaluation Thereof)

4 g of polyether polymer C produced in Reference Example 3, 5 g of lithium cobalt oxide powder, 4 g of graphite, 0.01 g of dicumyl peroxide and 30 ml of acetonitrile were mixed together to prepare a paste. The paste was coated on an aluminum foil, and then dried. The film was heated at 150° C. for 2 hours to give a cured positive electrode film.

The solid electrolyte film made in Example 2 was sandwiched between the above-mentioned positive electrode film and a lithium metal foil to manufacture a cell. Charge and discharge characteristics of the cell were evaluated on a cell sample having a size of 20 mm×20 mm. That is, a constant current charge-discharge test was conducted wherein the charge was carried out until voltage reached to 4.2 V at 0.2 mA and the discharge was carried out until voltage reached to 2.7 V at 0.2 mA. The service capacities at the tenth cycle and 50th cycle were 97% and 91%, respectively, provided that the service capacity at the third cycle was 100%.

Example 10
(Manufacture of Lithium Ion Secondary Battery and Evaluation Thereof)

A positive electrode film was made by the same procedures as described in Example 9 wherein the polyether polymer treated for applying a high-shearing-force in Example 5 was used instead of polyether polymer C produced in Reference Example 3 with all other conditions remaining the same.

The solid electrolyte film made in Example 2 was sandwiched between the above-mentioned positive electrode film and a lithium metal foil to manufacture a cell. Charge and discharge characteristics of the cell were evaluated on a cell sample having a size of 20 mm×20 mm. That is, a constant current charge-discharge test was conducted wherein the charge was carried out until voltage reached to 4.2 V at 0.2 mA and the discharge was carried out until voltage reached to 2.7 V at 0.2 mA. The service capacities at the tenth cycle and 50th cycle were 97% and 92%, respectively, provided that the service capacity at the third cycle was 100%.

Industrial Applicability

The polyether polymer used in the present invention, which has a toluene insoluble content of not larger than 5% by weight, or has been prepared by applying a shearing force under heated conditions using an extruder to thereby reduce the Mooney viscosity, exhibits good film-forming property, and gives a solid polymer electrolyte exhibiting uniform and good ionic conductivity, and having high mechanical strength and good surface smoothness.

TABLE 1

|  | Ex. 1 | Ex. 2 | Ex. 3 | Ex. 4 | Ex. 5 | Ex. 6 | Ex. 7 | Ex. 8 | C. Ex. 1 | C. Ex. 2 |
|---|---|---|---|---|---|---|---|---|---|---|
| Polymer | C | D | E | A | A | A | B | C | A | B |
| Composition (mole %) | | | | | | | | | | |
| EO units | 90 | 89.2 | 90 | 89.5 | 89.5 | 89.5 | 90 | 90 | 89.5 | 90 |
| PO units | 3.8 | 7.7 | 3.8 | 3.7 | 3.7 | 3.7 | 3.5 | 3.8 | 3.7 | 3.5 |
| AGE units | 6.2 | 3.1 | 6.2 | 6.8 | 6.8 | 6.8 | 6.5 | 6.2 | 6.8 | 6.5 |
| Toluene insoluble content (%) | 0.7 | 0.3 | 0.6 | 13 | 13 | 13 | 7 | 0.7 | 13 | 7 |
| Mooney viscosity | 60 | 48 | 70 | 130 | 130 | 130 | 75 | 60 | 130 | 75 |
| Reduced viscosity (dl/g) | 1.5 | 1.2 | 4.9 | * | * | * | * | 1.5 | * | * |
| Shear treatment conditions | | | | | | | | | | |
| Temperature (° C.) | — | — | — | 240 | 240 | 240 | 240 | 120 | — | — |
| Shear rate (S$^{-1}$) | — | — | — | 800 | 2400 | 4000 | 2400 | 1600 | — | — |
| Rotational number of screw (rpm) | — | — | — | 100 | 300 | 500 | 300 | 200 | — | — |
| Staying time in barrel (sec) | — | — | — | 120 | 100 | 90 | 100 | 110 | — | — |
| Polymer properties after shear treatment | | | | −180 | −160 | −150 | −160 | −170 | | |
| Toluene insoluble content (%) | — | — | — | 0.7 | 0.6 | 0.8 | 0.6 | 0.5 | — | — |
| Mooney viscosity | — | — | — | 90 | 60 | 30 | 45 | 48 | — | — |
| Reduced viscosity (dl/g) | — | — | — | 2.8 | 2.0 | 1.1 | 1.2 | 1.1 | — | — |
| Die swell (%) | 30 | 28 | 32 | 32 | 28 | 25 | 26 | 25 | 65 | 55 |
| Film properties | | | | | | | | | | |
| Film surface state | A | A | A | B | A | A | A | A | C | C |
| Film strength | A | A | A | A | A | A | A | A | B | C |
| Ionic conductivity (S/cm) | $5.0 \times 10^{-4}$ | $5.3 \times 10^{-4}$ | $5.5 \times 10^{-4}$ | $3.5 \times 10^{-4}$ | $5.5 \times 10^{-4}$ | $6.0 \times 10^{-4}$ | $5.3 \times 10^{-4}$ | $5.1 \times 10^{-4}$ | $6.0 \times 10^{-5}$ | $6.1 \times 10^{-5}$ |

Note,
Polymer composition:
EO: Ethylene oxide,
PO: Propylene oxide,
AGE: Allyl glycidyl ether
Reduced viscosity,
* Measurement was impossible because viscosity tube was clogged with toluene insolubles As seen from Table 1, a polyether polymer containing more than 5% by weight of toluene insolubles, or a polyether polymer not having been treated for applying a high-shearing force, has undesirably high viscosity, and therefore, a solid polymer electrolyte composition comprising said polyether polymer has poor extrusion-processability and a film having good surface smoothness is difficult to make, and the cured solid polymer electrolyte film has poor mechanical strength (Comparative Examples 1 and 2).

In contrast, a polyether polymer having a toluene insoluble content of not larger than 5% by weight (Examples 1 to 3), or a polymer having been treated for applying a high-shearing force (Examples 4 to 8) has a low viscosity, and therefore, a solid polymer electrolyte composition comprising said polyether polymer exhibits good extrusion-processability, especially good swell and surface smoothness, and the cured solid polymer electrolyte film has high mechanical strength, and good pliability and ionic conductivity.

As seen from Examples 9 and 10, lithium ion secondary batteries made by using the solid electrolyte composition of the present invention exhibit minimized reduction of service capacity when charge and discharge are repeated.

The above-mentioned solid polymer electrolyte has good processing property and formability, and good pliability, and therefore, batteries made using the solid electrolyte can have various shapes without restriction. For example, a filmy electrode can easily be made. The solid electrolyte has no fluidity and the batteries are beneficial in that they have no fear of giving a damage to instruments caused by liquid leakage, and have high safety. Therefore, the solid polymer electrolyte is suitable for batteries and capacitors, especially for a lithium ion secondary battery.

What is claimed is:

1. A composition for solid polymer electrolyte characterized by comprising a polyether polymer having a toluene insoluble content of not larger than 5% by weight, and an electrolyte salt compound soluble in the polyether polymer.

2. The composition for solid polymer electrolyte according to claim 1, wherein the polyether polymer has a Mooney viscosity in the range of 3 to 190.

3. A composition for solid polymer electrolyte characterized by comprising a polyether polymer having a Mooney viscosity in the range of 3 to 190 and an electrolyte salt compound soluble in the polyether polymer; wherein said polyether polymer has been prepared by applying a shearing force under heated conditions using an extruder to a polyether polymer having a Mooney viscosity in the range of 10 to 200 so that the Mooney viscosity is reduced by 5 or more.

4. The composition for solid polymer electrolyte according to claim 3, wherein said polyether polymer having been prepared by applying a shearing force to reduce the Mooney viscosity has a toluene insoluble content in the range of 0% to 5% by weight.

5. The composition for solid polymer electrolyte according to claim 1, wherein said polyether polymer comprises, based on the total monomer units, 70% to 99% by mole of ethylene oxide units and 30% to 1% by mole of units derived from an oxirane monomer copolymerizable with ethylene oxide, wherein the polyether polymer contains not larger than 15% by mole, based on the total monomer units, of units derived from an oxirane monomer having a crosslink-forming functional group.

6. The composition for solid polymer electrolyte composition according to claim 1, wherein said polyether polymer has a reduced viscosity in the range of 0.5 to 15 dl/g.

7. A polyether polymer having a Mooney viscosity in the range of 3 to 190, which has been prepared by applying a shearing force under heated conditions using an extruder to a polyether polymer having a Mooney viscosity in the range of 10 to 200 so that the Mooney viscosity is reduced by 5 or more.

8. The polyether polymer according to claim 9, which has a toluene insoluble content of not larger than 5% by weight.

9. A process for producing a polyether polymer having a Mooney viscosity in the range of 3 to 190, characterized in that a shearing force is applied under heated conditions using an extruder to a polyether polymer having a Mooney viscosity in the range of 10 to 200 so that the Mooney viscosity is reduced by 5 or more.

* * * * *